(12) United States Patent
Emeterio et al.

(10) Patent No.: US 6,181,857 B1
(45) Date of Patent: Jan. 30, 2001

(54) METHOD FOR ACCESSING OPTICAL FIBERS CONTAINED IN A SHEATH

(75) Inventors: Marta Garcia S. Emeterio, Santander (ES); Stefan Richter, Hickory, NC (US)

(73) Assignee: Alcatel, Paris (FR)

( * ) Notice: Under 35 U.S.C. 154(b), the term of this patent shall be extended for 0 days.

(21) Appl. No.: 09/310,601

(22) Filed: May 12, 1999

(51) Int. Cl.$^7$ ....................................................... G02B 6/04
(52) U.S. Cl. ........................ 385/115; 385/100; 385/147
(58) Field of Search ..................................... 385/100, 102, 385/104–106, 115, 147; 427/154, 163.1

(56) References Cited

U.S. PATENT DOCUMENTS

| | | |
|---|---|---|
| 3,902,206 | 9/1975 | Naquin . |
| 4,331,379 | 5/1982 | Oestreich et al. . |
| 4,746,190 | 5/1988 | Oestreich et al. . |
| 5,085,114 | 2/1992 | DeRoss et al. . |
| 5,155,789 | 10/1992 | LeNoane et al. . |
| 5,181,268 | 1/1993 | Chien . |
| 5,345,526 | 9/1994 | Blew . |
| 5,408,564 | 4/1995 | Mills . |
| 6,104,846 | * 8/2000 | Hodgson et al. ....................... 385/12 |

FOREIGN PATENT DOCUMENTS

| | | |
|---|---|---|
| 197 20 598 | 11/1998 | (DE) . |
| 197 49 930 | 5/1999 | (DE) . |
| 2 212 626 | 7/1989 | (GB) . |

* cited by examiner

*Primary Examiner*—James Phan
(74) *Attorney, Agent, or Firm*—Ware, Fressola, Van der Sluys & Adolphson

(57) ABSTRACT

The present invention provides a method for accessing a fiber from a bundle of fibers disposed in a sheath. The method comprises several steps which include cutting the sheath circumferentially at a leading position as well as circumferentially at a trailing position to divide the sheath into a leading section, a mid-section and a trailing section. The sheath is spread along the axis of the sheath between the leading section and the mid-section to create a first access opening. A fiber to be accessed is cut at the first access opening. The leading section and mid-section are pushed together to close the first access opening. The sheath is spread along the axis of the sheath between the mid-section and the trailing section to create a second access opening wherein the fiber is pulled from the mid-section of the sheath so that it extends out of the second access opening. The mid-section and trailing section of the sheath are pushed together to close the second access opening while the fiber is permitted to extend out of the trailing cut. Tape may be placed around the cuts to physically join the sections of the sheath and to seal out contaminants.

7 Claims, 3 Drawing Sheets

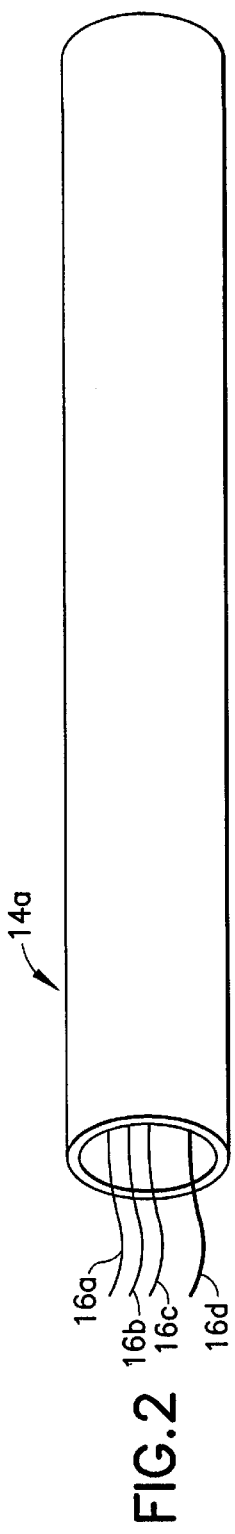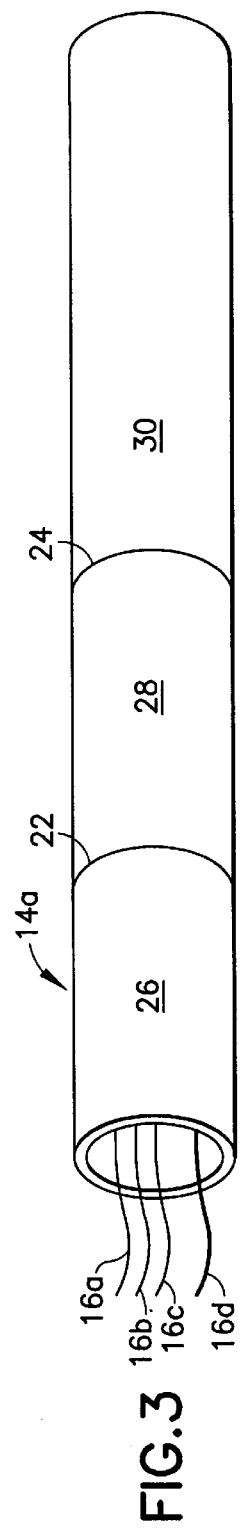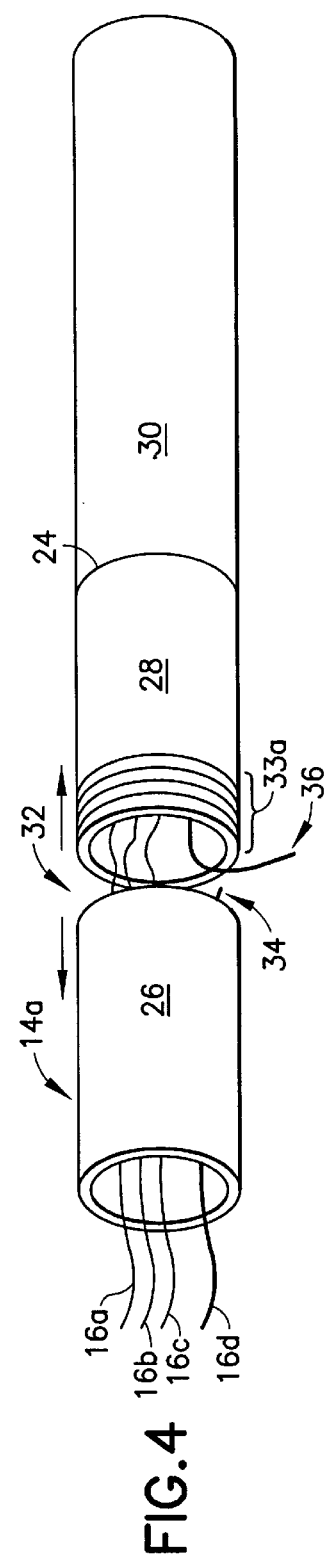

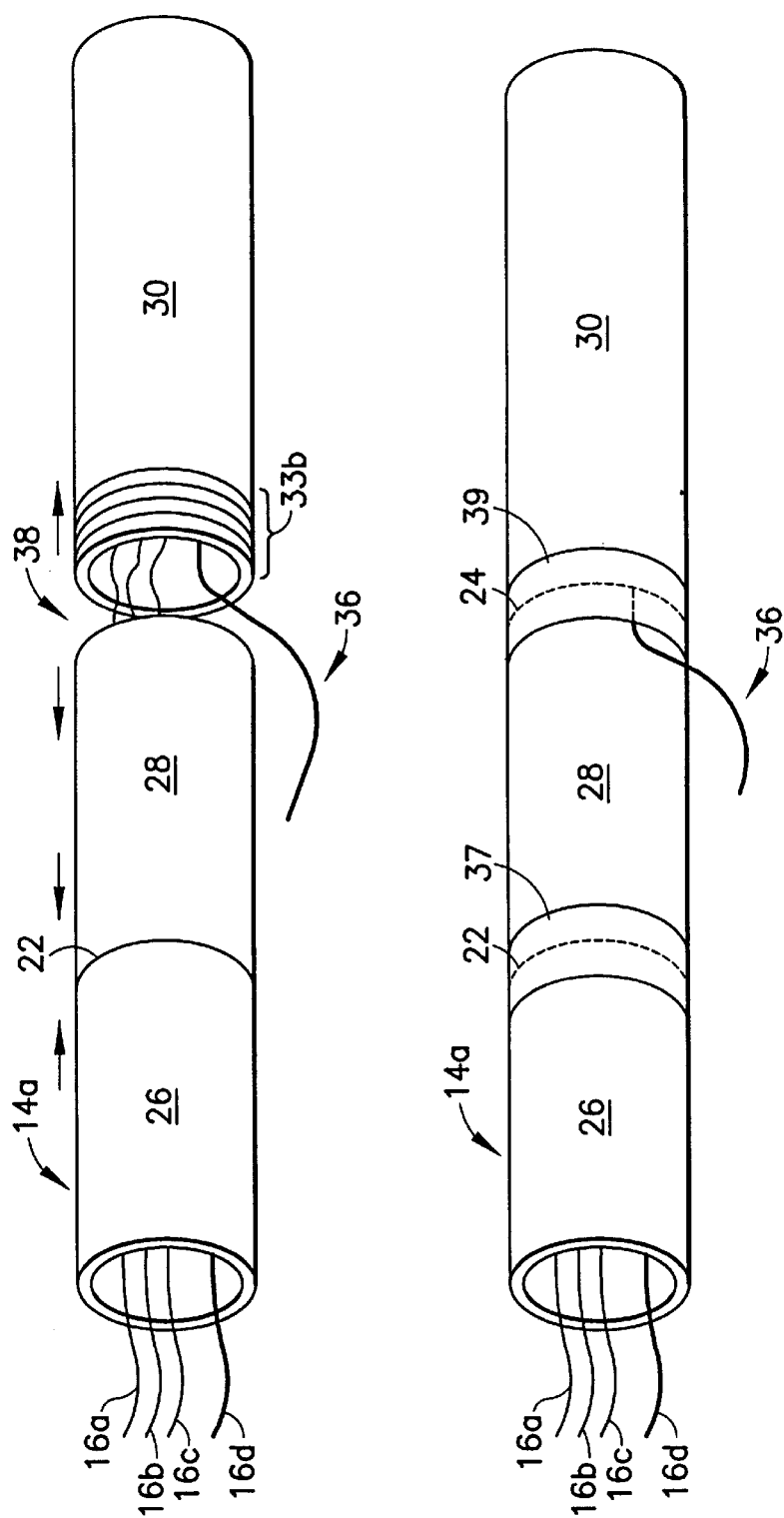

METHOD FOR ACCESSING OPTICAL FIBERS CONTAINED IN A SHEATH

BACKGROUND OF THE INVENTION

1. Field of the Invention

The present invention relates to optical fiber telecommunications cables. More particularly, the present invention relates to a method for accessing an optical fiber in a sheath typically disposed in a telecommunications cable.

2. Description of the Prior Art

Telecommunication cables employing optical fibers are widely used in the telecommunications industry because such optical fibers provide relatively wide bandwidth and low noise operation. Telecommunications cables employing multiple optical fibers are used for a variety of applications including long distance telephone communications, interexchange telephone applications, and other telephony and data transmission applications. Cables containing multiple optical fibers are also being used by cable television networks in the place of traditional coaxial cables containing metallic conductors to provide the bandwidth necessary to support services such as near real-time, on-demand video to the home.

A typical optical fiber cable is formed by one or more cores which contains a plurality of optical fibers and an outer protective jacket surrounding the one or more cores. There are numerous issued U.S. patents that describe various, specific configurations for such cables. In a typical commercially available loose-tube type optical fiber cable, a series of plastic buffer tubes or sheaths are stranded around a central support member in one or more concentric layers. In most commercially available cables, the plastic buffer tubes are provided with a unique color for identification purposes. Also, each of the fibers in a buffer tube are provided with a unique color-coded coating thereon to enable identification of a particular individual fiber from the other fibers within a colored buffer tube of the cable. The color-coding scheme is important when fibers are to be dropped out of the cable to provide a local optical fiber branch.

Cables which are useful in the cable television field typically have a relatively small number of grouped fibers, typically three or four fibers, which are identified, accessed and connected at a drop point. In addition, a large number of spaced apart drop points are typically provided along the length of the cable to enable fibers to be dropped, as required. When a fiber is to be dropped, access to a fiber protected by one of the buffer tubes in the cable is made at a drop point. Typically, access is made by cutting into the outer jacket and using buffer tube cutting or slitting tools to remove a portion of the buffer tube. The use of such tools is necessary for some cable designs because the buffer tube material is tough. On the other hand, some buffer tube or sheath materials are relatively soft and tools are not required. Whether a buffer tube slitting tool is necessary or not, it is important that during the procedure of accessing an optical fiber, other optical fibers are not damaged. Also, once the optical fiber is accessed, it is important to protect the remaining optical fibers in a manner similar to the type of protection provided by the buffer tube. Because the prior methods for accessing the optical fibers typically remove a portion of the buffer tube, the portion of the tube or sheath is no longer available to provide protection to the remaining fibers.

SUMMARY OF THE INVENTION

It is an object of the present invention to provide a method for accessing an optical fiber contained in an optical fiber buffer tube or sheath. It is another object of the present invention to provide a method for accessing an optical fiber which leaves the buffer tube or sheath accessed substantially in-tact after access has been made.

The present invention is designed to meet the foregoing objectives by providing a method for accessing a fiber from a bundle of fibers disposed in a sheath. The method comprises several steps, including: cutting the sheath circumferentially at a leading position and cutting the sheath circumferentially at a trailing position to divide the sheath into a leading section, a mid-section and a trailing section; spreading the cut sheath along the axis of the sheath between the leading section and the mid-section to create a first access opening; cutting a fiber to be accessed at the first access opening so as to create an accessible fiber portion and a severed fiber portion; pushing the leading section and mid-section together to close the first access opening; spreading the cut sheath along the axis of the sheath between the mid-section and the trailing section to create a second access opening; pulling the accessible fiber portion from the mid-section of the sheath so that the accessible fiber portion extends out of the second access opening; and pushing the mid-section and trailing section of the sheath together to close the second access opening wherein the accessible fiber portion is permitted to extend out of the trailing cut.

The invention will be more fully understood when reference is made to the following detailed description taken in conjunction with the accompanying drawings.

BRIEF DESCRIPTION OF THE DRAWINGS

The drawings, not drawn to scale, include:

FIG. 2, which is a side view of a sheath and optical fibers forming one of optical fiber groups contained in the optical fiber cable illustrated in FIG. 1;

FIG. 3, which is a side view of the optical fiber group illustrated in FIG. 2 having leading and trailing cuts made therein to form a leading section, a mid-section and a trailing section;

FIG. 4, which is a side view of the optical fiber group illustrated in FIG. 3, wherein the leading section and mid-section are separated from each other to enable access to the fibers;

FIG. 5, which is a side view of the optical fiber group illustrated in FIG. 3, wherein the mid-section and trailing section are separated from each other to enable access to the fibers; and FIG. 6, which is a side view of the optical fiber group illustrated in FIG. 3, wherein the sheath is pushed back together but an accessed optical fiber is allowed to pass through the trailing cut.

DETAILED DESCRIPTION OF THE PRESENT INVENTION

Figure 1:
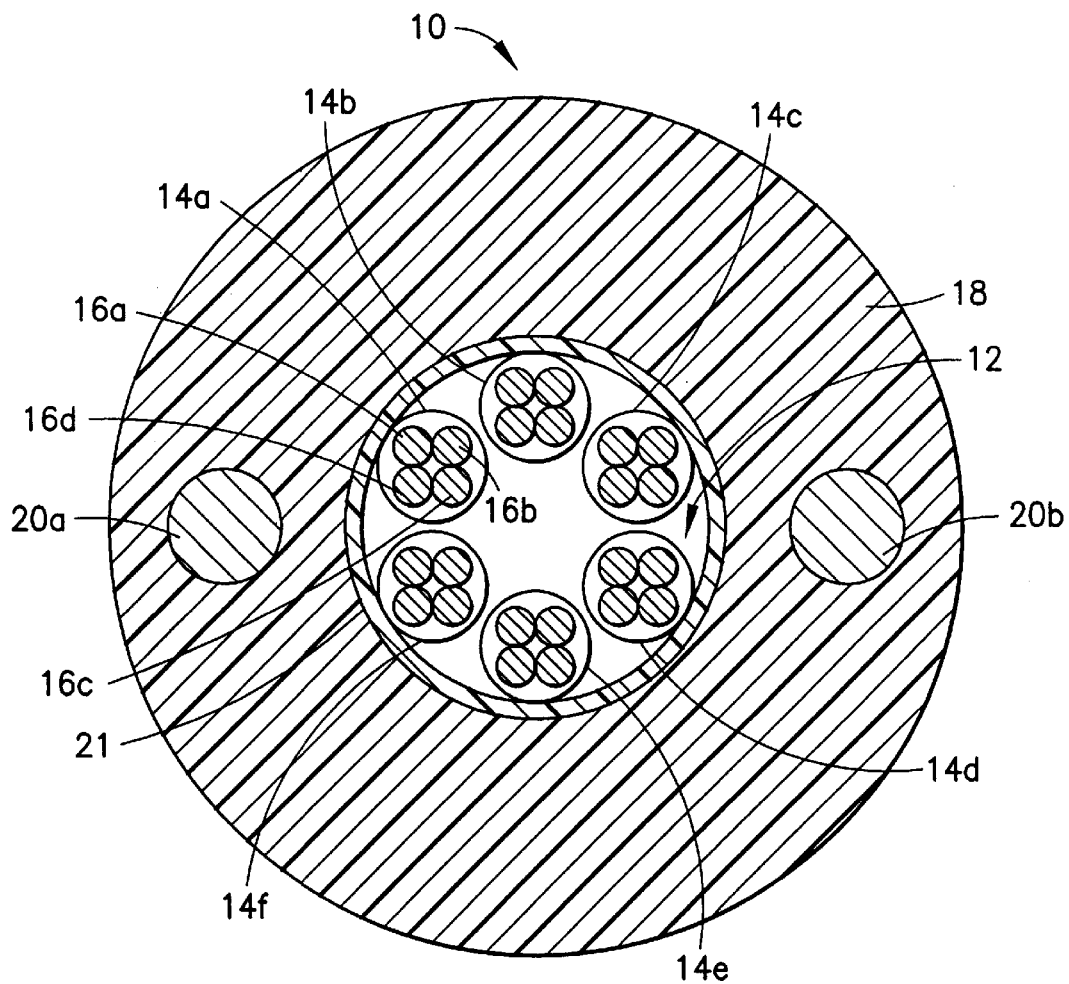
FIG. 1, which is a cross-sectional view of an optical fiber cable containing six optical fiber groups, each of the group being formed by four optical fibers and sheath enveloping the optical fibers.

The present invention concerns a method for accessing optical fibers in an optical fiber buffer tube or sheath of an optical fiber cable for the purpose of dropping one or more optical fibers from the cable. Dropped optical fibers from an optical fiber cable are typically spliced to other optical fibers. These optical fibers may be terminated at a home or office for example. The method will be described hereinafter with respect to an optical fiber cable 10 such as that illustrated in FIG. 1. However, those skilled in the art should appreciate that the method may be practiced on any optical fiber cable containing buffer tubes or sheaths which are loosely contained within a protective jacket.

In FIG. 1, the optical fiber cable 10 illustrated has a jacket 11 forming a cavity which contains a telecommunications core 12. The core 12 is formed by a plurality of colored optical fiber buffer tubes or sheaths 14a–14f, defining optical fiber groups, containing one or more color coded optical fibers, such as fibers 16a–16d in the first sheath 14a. A pair of strength members 20a, 20b are embedded in the jacket 11. The core 12 may be wrapped with a water swellable and/or heat protection tape as well as aramid, polyester and/or glass yarns 21 if desired.

Prior to exercising the steps of the present invention, which are described below, access to the cavity of the optical fiber cable 10 is made in an ordinary manner known by those skilled in the art. Access to the jacket cavity is necessary to obtain access to the optical fibers in the buffer tubes or sheaths contained therein forming the core. Referring to FIGS. 2 through 6, once access to the cavity has been accomplished, access to an optical fiber, such as 16d, contained in one of the sheaths, such as 14a, can be accomplished by cutting the sheath 14a circumferentially at a leading position 22 and cutting the sheath 14a circumferentially at a trailing position 24 to divide the sheath 14a into a leading section 26, a mid-section 28 and a trailing section 30 as illustrated in FIG. 2. Once the aforementioned cuts are made, then the sheath 14a is spread apart along the axis of the sheath between the leading section and the mid-section to create a first access opening 32 as illustrated in FIG. 3. The spreading of the sheath may create some wrinkles 33a in the sheath. A fiber, such as 16d, which is to be accessed or dropped is cut at the access opening 32 so as to create an accessible fiber portion 34 and a severed fiber portion 36 as shown in FIG. 4. Once the fiber 16d is severed, the leading section and mid-section are pushed together to close the first access opening 32 as shown in FIG. 5. Any wrinkles 33a are smoothed over as necessary. The leading cut may be wrapped with an adhesive tape 37 to keep the leading section 26 and mid-section 28 together. Adhesive tape is preferably used and wrapped completely around the leading cut 22 to provide a seal to prevent ingress of contaminants into the sheath. Afterwards, the sheath is spread apart along the axis of the sheath between the mid-section 28 and the trailing section 30 to create a second access opening 38 as also illustrated in FIG. 5. Again, the spreading of the sheath may result in some wrinkles 33b in the sheath. The accessible fiber portion 36 of fiber 16d is pulled from the mid-section 28 towards the trailing section of the sheath 14a so that the accessible fiber portion 36 extends out of the second access opening 38 as depicted in FIG. 5. Once this is accomplished, the mid-section 28 and the trailing section 30 of the sheath 14a are pushed together to close the second access opening 38 as shown in FIG. 6. Any wrinkles 33b are smoothed over as necessary. The accessible fiber portion 36 is permitted to extend out of the trailing cut 24. Adhesive tape 39 may be wrapped around the trailing cut 24 to keep the mid-section 28 and trailing section 30 together and to prevent the ingress of contaminants, such as moisture, into the sheath 14a where it could damage the delicate optical fibers 16a–16d contained therein.

Under the method, although the sheath 14a has been accessed to drop an optical fiber, the sheath 14a remains substantially intact, unlike prior art methods where a portion of the sheath is removed. Because the sheath 14a remains substantially intact, the other fibers 16a–16c which are not severed and dropped through the trailing cut 24 remain protected by the sheath 14a. The method works particularly well with sheaths that are relatively soft and pliable made from materials such as plasticized polyvinyl chloride or polyethylene/polypropylene copolymeric materials. A suitable sheath material for an optical fiber cable which works well with this method is described in pending U.S. patent application Ser. No. 09/236,873, assigned to the same assignee. The materials described therein are flexible thermoplastic polyolefin elastomers.

As shown above, the present invention provides a method which enables access to optical fibers contained in a sheath while leaving the sheath substantially intact. The embodiments disclosed herein admirably achieve the objects of the present invention; however, it should be appreciated by those skilled in the art that departures can be made by those skilled in the art without departing from the spirit and scope of the invention which is limited only by the following claims.

What is claimed is:

1. A method for accessing a fiber from a bundle of fibers disposed in a sheath, the method comprising the steps of:

cutting the sheath circumferentially at a leading position and cutting the sheath circumferentially at a trailing position to divide the sheath into a leading section, a mid-section and a trailing section;

spreading the cut sheath apart along the axis of the sheath between the leading section and the mid-section to create a first access opening;

cutting a fiber to be accessed at the access opening so as to create an accessible fiber portion and a severed fiber portion;

pushing the leading section and mid-section together to close the first access opening;

spreading the cut sheath apart along the axis of the sheath between the mid-section and the trailing section to create a second access opening;

pulling the accessible fiber portion from the mid-section of the sheath so that the accessible fiber portion extends out of the second access opening; and pushing the mid-section and trailing section of the sheath together to close the second access opening wherein the accessible fiber portion is permitted to extend out of the trailing cut.

2. The method of claim 1 comprising the additional step of physically joining the leading section and the mid-section of the sheath.

3. The method of claim 1 comprising the additional steps of physically joining the leading section and the mid-section of the sheath and sealing the leading cut.

4. The method of claim 1, comprising the additional step of physically joining the mid-section and trailing section of the sheath.

5. The method of claim 1 comprising the additional steps of physically joining the mid-section and trailing section of the sheath and sealing the trailing cut.

6. The method of claim 1 comprising the additional steps of physically joining the leading section and the mid-section of the sheath and physically joining the mid-section and trailing section of the sheath.

7. The method of claim 1 comprising the additional steps of physically joining the leading section and the mid-section of the sheath, sealing the leading cut, physically joining the mid-section and trailing section of the sheath, and sealing the trailing cut.

* * * * *